No. 721,269. PATENTED FEB. 24, 1903.
A. W. YALE.
AUTOMOBILE.
APPLICATION FILED JULY 9, 1902.
NO MODEL. 2 SHEETS—SHEET 1.

Witnesses:
Wilhelm Vogt
Thomas M. Smith

Inventor:
Arthur W. Yale,
by J. Walter Douglas
Attorney

No. 721,269. PATENTED FEB. 24, 1903.
A. W. YALE.
AUTOMOBILE.
APPLICATION FILED JULY 9, 1902.
NO MODEL. 2 SHEETS—SHEET 2.
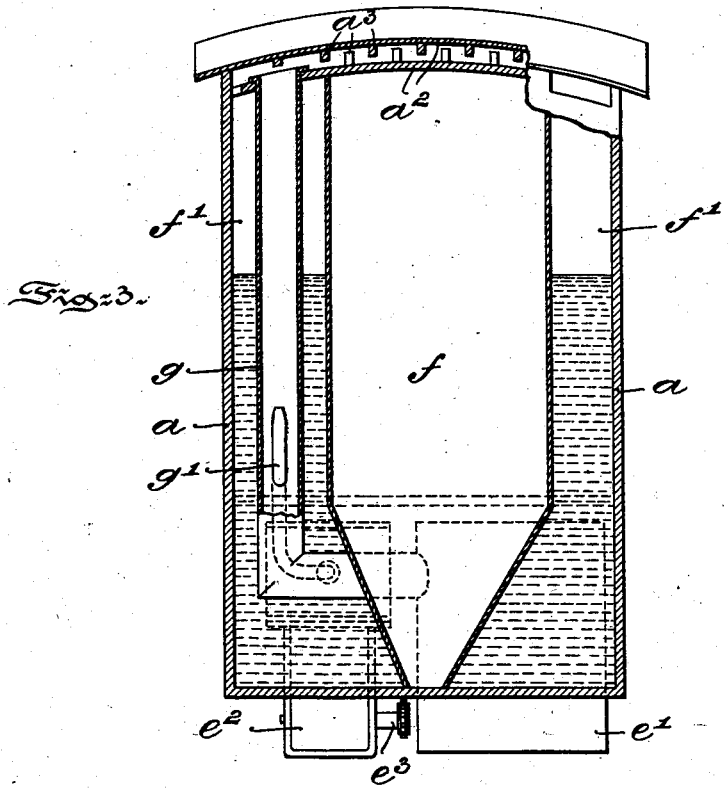
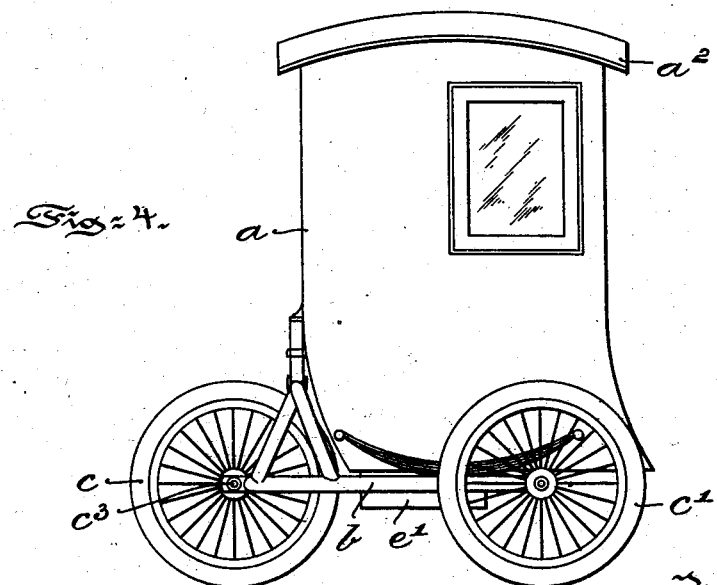

UNITED STATES PATENT OFFICE.

ARTHUR W. YALE, OF PHILADELPHIA, PENNSYLVANIA.

AUTOMOBILE.

SPECIFICATION forming part of Letters Patent No. 721,269, dated February 24, 1903.

Application filed July 9, 1902. Serial No. 114,870. (No model.)

*To all whom it may concern:*

Be it known that I, ARTHUR W. YALE, a citizen of the United States, residing at the city of Philadelphia, in the county of Philadelphia and State of Pennsylvania, have invented certain new and useful Improvements in Automobiles, of which the following is a specification.

My invention has relation to an automobile; and in such connection it relates to the construction and arrangement of parts comprising in their entirety an automobile simple, comparatively inexpensive, and light in weight.

The principal objects of my present invention are, first, to provide in an automobile a superstructure or frame mounted upon and supported by a truck having three wheels, of which the rear wheel is preferably the driving-wheel and the two front wheels are the steering-wheels, said frame having a seat beneath which the motive power is stored and back of which a storage-space for fuel, &c., is provided, and, second, to provide in such an automobile a means for utilizing the exhaust from the engine or motor to assist in forcing a draft through the fire-chamber and a means located beneath the roof of the structure whereby a portion of the exhaust may be condensed and returned to the source of supply for the engine or motor.

The nature and scope of my invention will be more fully understood from the following description, taken in connection with the accompanying drawings, forming part hereof, in which—

Figure 1:
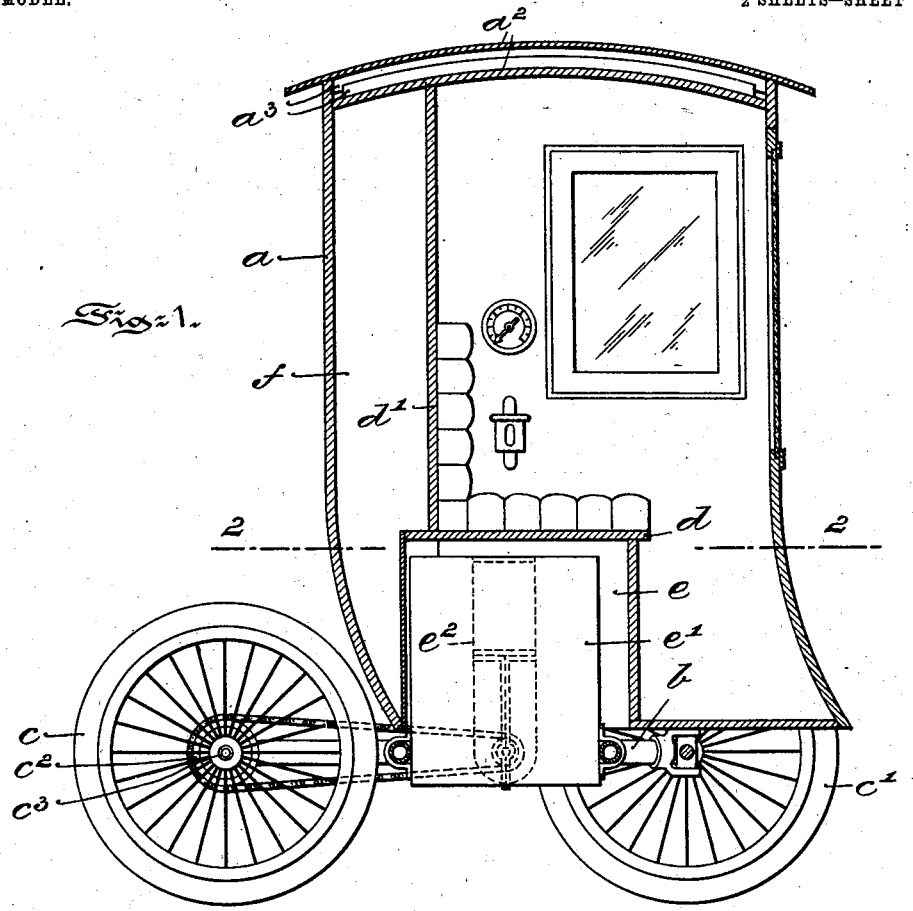
Figure 2:
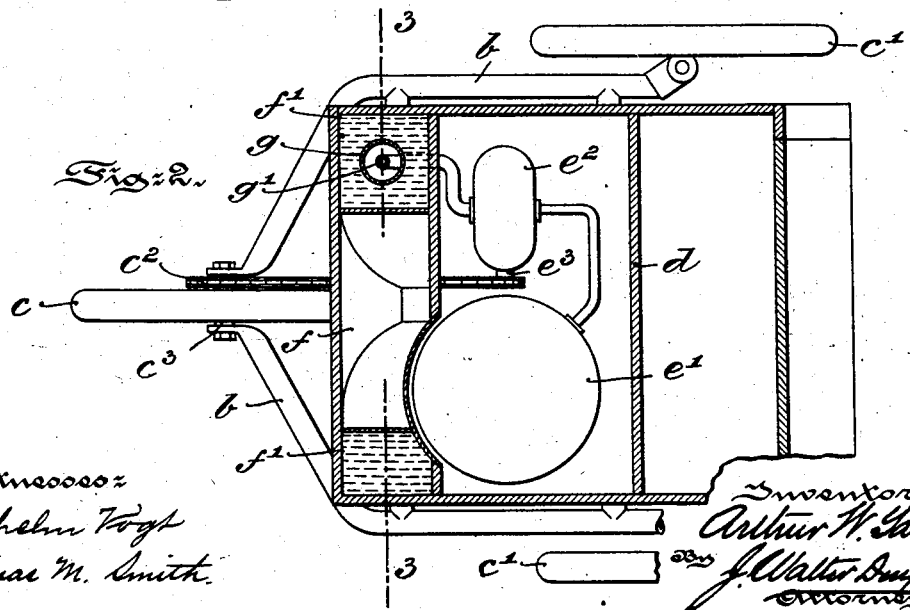

Figure 1 is a vertical sectional view taken centrally through an automobile embodying main features of my invention. Fig. 2 is a horizontal sectional view taken on the line 2 2 of Fig. 1. Fig. 3 is a transverse sectional view taken on the line 3 3 of Fig. 2; and Fig. 4 is a side elevational view, on a smaller scale, of the automobile.

Referring to the drawings, $a$ represents the frame or superstructure of the vehicle, the base or floor $a'$ of which is supported upon a truck $b$, provided with three wheels $c$ and $c'$. The front wheels $c'$ $c'$ are preferably the steering-wheels, whereas the rear wheel $c$ is the driving-wheel of the vehicle. Within the frame $a$ of the vehicle is arranged a seat $d$, having a back $d'$. Beneath the seat $d$ is formed a chamber or compartment $e$, wherein the boiler $e'$ and engine or motor $e^2$ are located. The shaft $e^3$ of the engine or motor $e^2$ is connected by a chain with a sprocket-wheel $c^2$, located on the shaft $c^3$ of the rear driving-wheel $c$. At the rear of the structure $a$ and back of the seat-back $d'$ are formed three compartments or chambers, of which the central, $f$, is adapted for the reception and storage of fuel, &c. The end chambers $f'$ are adapted to contain water to supply the boiler $e'$. The stack or flue $g$ from the boiler $e'$ traverses one of these compartments and discharges into a compartment formed between the double-roof walls $a^2 a^2$. Into this stack or flue $g$ extends a pipe $g'$, through which the exhaust from the engine or motor $e^2$ discharges into said stack or flue $g$. This arrangement serves to assist the draft through the flue $g$ and virtually creates a forced draft beneath the boiler $e'$. The walls of the double roof $a^2$ are provided with transverse ribs $a^3$, arranged in staggered relationship to each other, and over these ribs $a^3$ the exhaust is obliged to travel. These ribs $a^3$, interposed in the path of the exhaust, cause said exhaust to condense in the double roof $a^2$, from which the condensation passes back to the source of supply.

Having thus described the nature and objects of my invention, what I claim as new, and desire to secure by Letters Patent, is—

1. In an automobile, a superstructure provided with a seat, a motor or engine arranged beneath the seat, a chamber formed in the superstructure for the storage of fuel and the like, a fluid-compartment arranged between the seat and superstructure, a flue or stack traversing said fluid-compartment and a double-walled roof into which said stack discharges.

2. In an automobile, a superstructure provided with a seat beneath which the motor or engine is located, and a series of chambers formed between the back of the seat and the back of the superstructure, said chambers arranged for the storage of fuel and liquid for supplying the motor.

3. In an automobile, a superstructure provided with a seat, an engine located beneath the seat, a fluid-compartment arranged between the back of the seat and the back of the superstructure, a flue or stack traversing the fluid-compartment, and a double-walled roof into which the stack discharges.

4. In an automobile, a superstructure provided with a seat, an engine located beneath the seat, a fluid-compartment arranged between the back of the seat and the back of the superstructure, a roof having double walls, a series of ribs arranged in staggered relationship in said walls, a flue or stack traversing the fluid-compartment and discharging into said roof, and an exhaust-pipe discharging into said flue or stack.

In testimony whereof I have hereunto set my signature in the presence of two subscribing witnesses.

ARTHUR W. YALE.

Witnesses:
J. WALTER DOUGLASS,
THOMAS M. SMITH.